United States Patent [19]

Auth

[11] Patent Number: 4,693,603

[45] Date of Patent: Sep. 15, 1987

[54] RUGGEDIZED COMPACT INTERFEROMETER REQUIRING MINIMUM ISOLATION FROM MECHANICAL VIBRATIONS

[75] Inventor: Gerald L. Auth, Laguna Beach, Calif.

[73] Assignee: MIDAC Corporation, Costa Mesa, Calif.

[21] Appl. No.: 789,849

[22] Filed: Oct. 21, 1985

[51] Int. Cl.$^4$ ............................................. G01B 9/02
[52] U.S. Cl. ................................................... 356/346
[58] Field of Search ........................ 356/345, 346, 352; 318/640

[56] References Cited

U.S. PATENT DOCUMENTS 3,936,193  2/1976  Auth ...................................... 356/346
4,480,914  11/1984  Thompson et al. .................. 356/346

OTHER PUBLICATIONS

V. V. Arkhipov, "Fast Scanning Fourier Spectrometer with Electrodynamic Drive", Sov. J. Opt. Technol. 45(10), Oct. 1978.

Primary Examiner—Eugene R. LaRoche
Assistant Examiner—Robert J. Pascal
Attorney, Agent, or Firm—Thomas J. Plante

[57] ABSTRACT

A small ruggedized interferometer is disclosed, which can operate efficiently in spite of being subject to ambient mechanical vibrations. A prior art structure was analyzed to diagnose its performance deficiencies. The successful method is a step by step structural solution, beginning with the lowest frequency mechanical vibration resonance in the interferometer, restructuring to raise that frequency, then proceeding to the next lowest mechanical vibration resonance frequency in the interferometer, and so on. The movable mirror is carried by a parallelogram linkage. The minimum resonance in the present interferometer has been raised to approximately 1000 Hertz. A first (lowest) frequency resonance problem solved was due to the motor and its interface with the movable mirror. A second resonance problem solved was due to the vibration of the movable mirror itself. And a third resonance problem solved was due to the bearing means which pivotally connect the parallelogram linkage to the frame and to the movable mirror.

23 Claims, 21 Drawing Figures

RUGGEDIZED COMPACT INTERFEROMETER REQUIRING MINIMUM ISOLATION FROM MECHANICAL VIBRATIONS

The United States Government has a non-exclusive, paid-up license under this application, and any patent or patents issuing thereon, pursuant to Contract No. DAAK-11-84-C-0038 awarded by the U.S. Army Armament Research and Development Command. The inventions described and covered herein may be manufactured, used, and otherwise practiced, by or for the Government for Governmental purposes without the payment to patentee of any royalty thereon.

BACKGROUND OF THE INVENTION

The present invention relates to a significant need in the interferometer field. Relatively high resolution, relatively heavy (e.g., 75 to 80 lbs.) interferometers designed primarily for laboratory use generally operate in environments in which the interferometers are not mechanically coupled to vibrating equipment. There is a need for small (e.g., 5 lbs.) rugged interferometers which can be operated while mechanically coupled to vibrating apparatus without losing their optical efficiency because of such vibrations.

One use for such small interferometers is in portable units, where they are connected to a detector-cooling apparatus. Other uses include space vehicles, and generally any situation where the interferometers might be temporarily or permanently subjected to mechanical vibrations of nearby apparatus.

The primary field of interest of the present invention relates to short-stroke (e.g., 1 cm) inferferometers which can provide resolution of one-half wave number. Such small interferometers should have a reasonably large aperture, but be light, compact and rugged.

Ruggedness, in general, in this context is defined as imperviousness to mechanical vibrations which would adversely affect the performance of the interferometer. Such adverse effects occur if any functioning parts of the interferometer resonate to the mechanical vibrations of extraneous apparatus. Coolers, fans, air compressors, other motor-containing equipment, etc., all are possible sources of interferometer-disabling vibrations.

Figure 1:
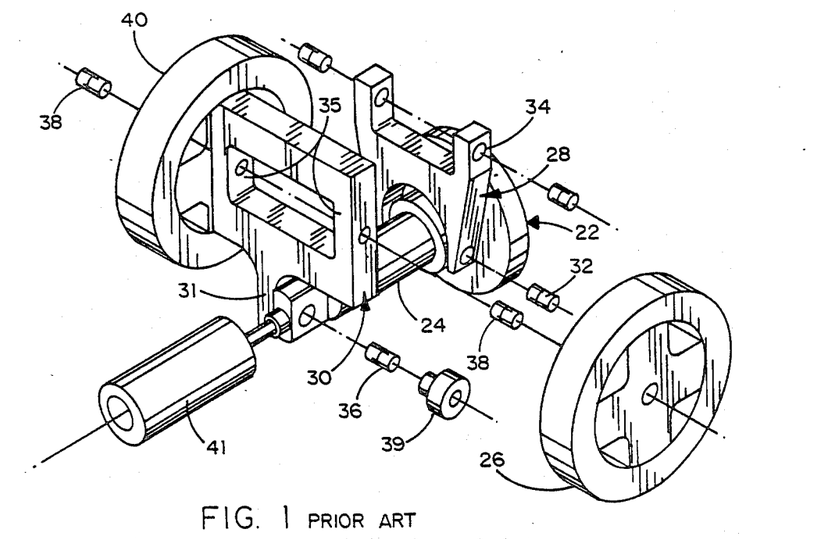
FIG. 1 is an exploded isometric view of the XM21 prior art structure, which is designed to support and drive the movable mirror of a compact interferometer.

Perception of the need addressed by the present invention came in large measure from analysis of the apparatus identified as the "XM21 alarm system". This system incorporates a detector mounted in a cooling apparatus, and a small interferometer supported on the cooling apparatus. In that interferometer structure, which is shown in FIG. 1, the moving mirror is moved by a torque motor, and is supported in a parallelogram arrangement having flex pivots connecting the parallelogram structure to the mirror carrier and to the stationary frame.

The XM21 design suffers from acute vibration sensitivity. It is too flimsy to allow a high gain, wide band mirror-drive loop to be incorporated with this interferometer. As a result, vibrations generated by the detector cooler cause significant mirror velocity variations. The XM21 program is an effort to build a highly sensitive system for remote detection of chemical agents. Its proposed characteristics are: (1) passive system; (2) all weather operation; (3) high probability of detection for all gas agents; and (4) low false alarm rate. To achieve these goals, the XM21 system includes an interferometer and a closed-cycle cooled HCT (mercury-cadmium-telluride) detector. Unfortunately, the cooler-generated vibration causes unacceptably large mirror velocity errors in the interferometer. Initial attempts to solve the problem were limited to vibration-isolating the interferometer from the cooler.

Susceptibility of the XM21 alarm system to vibration-caused interferometer problems led to the incorporation of elements which mechanically isolate the interferometer from the remainder of the system. While this constitutes an obvious "fix" for the vibration-caused interferometer problems, it constitutes, in effect, a submission to the problem, rather than a solution of it. Unfortunately, the use of isolating means creates the problem of relative displacement between the interferometer and the external elements with which it interacts, such as the radiation source, the sample (whatever is being analyzed), and the detector. Thus, undesired noise modulation is caused by the use of isolation as a means of avoiding vibration problems in the interferometer.

Since the mirror-drive loop is a closed servo loop, it necessarily includes mechanical elements in the overall loop. In the case of the XM21 design, the three mechanical pieces in the loop are the forward support arm, the flex pivots, and the moving mirror support assembly. The transfer function of these elements will have a strong influence on the stiffnes of the overall loop. The frequency response of the loop electronics must be tailored to keep the loop gain below one (1) at any resonance in the mechanical support structure. In other words, any phase shift in the mirror-drive loop must not reach 180°, because at that point the feedback control signals shift from negative feedback to positive feedback.

Because understanding the relatively complex background of the present invention is vital in appreciating its significance, a much more detailed analysis of the problem will now be set forth.

The efforts of suppliers of interferometer systems, in counteracting vibration problems, have generally used one of two concepts, each of which has complexity problems, and neither of which actually attacks the basic difficulties created by ambient vibrations.

One of the concepts, used by several suppliers, has been directed toward developing "tilt immune" optical systems, which incorporate complex and unwidely optics. They sacrifice the simplicity and low cost of the plane mirror optical system; and they to be large and awkward for a given level of performance.

The other concept, also used by several suppliers, has been directed toward automatic alignment systems, which incorporate complex electronic serve systems. They use elaborate electronic systems to do a job which could be accomplished more effectively and less expensively with clever mechanical design and precision machining.

Even more importantly, those who have adopted either of the two concepts identified above have been lead seriously astray in their efforts to design interferometers which are able to function efficiently in spite of "hostile" environments. Their concentration has been primarily on the problem of "static misalignment", neglecting the more vexing problems of (a) "dynamic misalignment", and (b) the even more serious "mirror velocity errors".

Neither of the types of interferometers discussed above attacks the effects of ambient vibration on: (a) alignment, and (b) mirror velocity. Such interferometers require the user to isolate the interferometer from the ambient vibrations in order to function. Such isolation is never completely successful and carries its own hazards. Most often, isolation of the interferometer from a vibrating ambient also isolates it from a vibrating source, or sample. The relative motion between the source, or sample, and the interferometer induces unwanted modulation in the signal. Since this modulation creates a noise which is proportional to the signal level, it destroys the chief advantages of the interferometer.

The effects of ambient vibration on mirror alignment are obvious. Any vibration whose frequency is higher than the lowest frequency ressonance of the support structure will cause the mirrors to vibrate. Ambient vibrations which substantially correspond to the mirror support resonances will cause very large vibrations of the mirrors. These dynamic misalignments induce both amplitude and phase errors in the interferogram. Such errors also induce noise proportional to the signal.

The effects on mirror velocity are far more subtle and pernicious. This is due to the interaction between the structural resonance and the mirror drive control loop. As stated above, the mirror drive control loop must have a gain less than one at the lowest frequency resonance of the structure. To be precise, the gain of the loop times the "Q" factor of the structural resonance must be less than one. As a practical matter, to achieve this condition, the gain of the loop must be low to start with, and rolled off at a low enough frequency to drop below one, at a frequency significantly below the lowest frequency resonance. As a consequence, the mirror drive loop cannot compensate for ambient vibrations which are higher in frequency than the lowest frequency structural resonance. Therefore, ambient vibrations, which do not bother the dynamic alignment, can nevertheless have severe effects on the mirror velocity.

The problem discussed in the preceding paragraph is particularly difficult to solve because, generally, high loop gain is desirable, in order to compensate for ambient vibrations.

An additional problem which tended to obscure the effects of mirror velocity errors was the poor state of theoretical modeling of their effects. There is very little information in the literature on their effects and until recent work by Zachor ("Drive Nonlinearities; Their Effects in Fourier Spectroscopy"—Applied Optics 1977—P. 1412), such information was wrong. The Aspen Proceedings, which are generally taken to be the best source of information for interferometer designers, have only one mention of mirror velocity errors, and that one was grossly inaccurate. This is in contrast to the fairly widespread understanding of the effects of mirror tilts.

SUMMARY OF THE INVENTION

The present invention eliminates vibration problems in an interferometer subjected to mechanical vibrations, i.e., mechanically-coupled to a source of vibrations, either without using isolating means to decouple the interferometer from the source of vibrations, or using only minimum isolation as necessitated by ambient conditions. It also retains the simplicity of the plane mirror Michelson interferometer.

Experience indicates that the vibrations which are likely to reach an interferometer are generally relatively low frequency vibrations, e.g., below 1,000 Hertz (1 KHz). The present invention provides an interferometer of the compact type in which there are no resonant frequencies in the range of the nearby mechanical vibrations. This is accomplished by so structuring the interferometer that its resonant frequencies are all above a desired minimum. The minimum resonant frequency in the present interferometer has been, somewhat arbitrarily, established as 1 KHz. Clearly, that specific requirement would not always represent the optimal goal; but the structural expedients would remain similar in all cases. The goal is to combine lightness with stiffness by eliminating sources of lower frequency resonance in the interferometer.

The present invention, in addition to solving the problem of static misalignment, on which prior efforts have focused, also solves the problems of dynamic misalignment and mirror velocity errors. Furthermore, this is accomplished without introducing errors due to isolation of the interferometer from the ambient vibration sources.

Stated somewhat differently, the present invention provides a relatively high gain, wide band mirror drive loop in the interferometer by significantly raising the resonant frequencies of the mechanical elements in that drive loop, thereby insuring that negative feedback is present at all times in the loop.

In situations where some isolation is unavoidable, either within the interferometer itself, or between the interferometer and exterior elements, the present invention holds such isolation to a minimum, thereby retaining its advantage over all similar systems in providing relatively low noise, and a relatively high gain, wide band mirror drive loop.

DETAILED DESCRIPTION OF SPECIFIC EMBODIMENTS

Figure 2A:
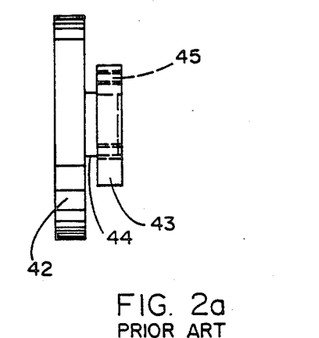
FIGS. 2A and 2B are side and rear views, respectively, of the movable mirror in FIG. 1 and of the structure required to attach it to its carrier.
Figure 2B:
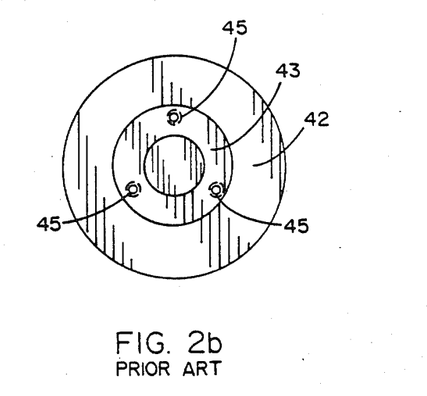

FIGS. 1 and 2 show the movable mirror drive in the prior art XM21 interferometer structure, whose deficiencies were discussed in the above background statement. As shown in FIG. 1, a movable mirror 22 is carried by a reciprocable rod 24, which is moved back and forth by a torque motor 26. The movable rod 24 is supported by a parallelogram arrangement having pivots at the corners. The rod 24 is the lower horizontal side of the parallelogram; the upper horizontal side is the fixed supporting structure, which is not shown. The vertical sides of the parallelogram are two swing arms 28 and 30. A plurality of flex pivots (7 in all) are used to connect the swing arms 28 and 30 to the upper and lower sides of the parallelogram, thereby permitting motion of rod 24. Arm 28 is connected to rod 24 by two flex pivots 32, and to the supporting structure by two flex pivots 34. Arm 30 has a single downwardly-extending flange 31 connected to rod 24 by one flex pivot 36, and has its spaced sides 35 connected to the supporting structure by two flex pivots 38. The lower flex pivot 36 is mounted inside an adjustment eccentric 39, which is rotatable to adjust the fore-to-aft distance between the front and rear flex pivots 32 and 36.

The torque of motor 26 is exerted on arm 30. At the opposite side of arm 30 from the motor, a tachometer 40, which is essentially a motor in reverse, is used to provide velocity feedback measurement. A position feedback device 41, which is a differential transformer (LVDT), is associated with the end of the movable structure remote from mirror 22.

FIGS. 2A and 2B are closeup views of the movable mirror 22 and its mounting flange. The mirror surface is on a round plate 42, which is integral with a mounting flange 43, the plate and flange being connected by an undercut portion 44. The mounting flange 43 has a plurality of holes 45, adapted to receive fastening means, which clamp the mounting flange to a collar on the rod 24. This intermediate structure for connecting the mirror to the rod in the XM21 interferometer is necessary, because directly securing fastening means to the mirror plate 42 would cause distortion of the mirror.

Figure 3:
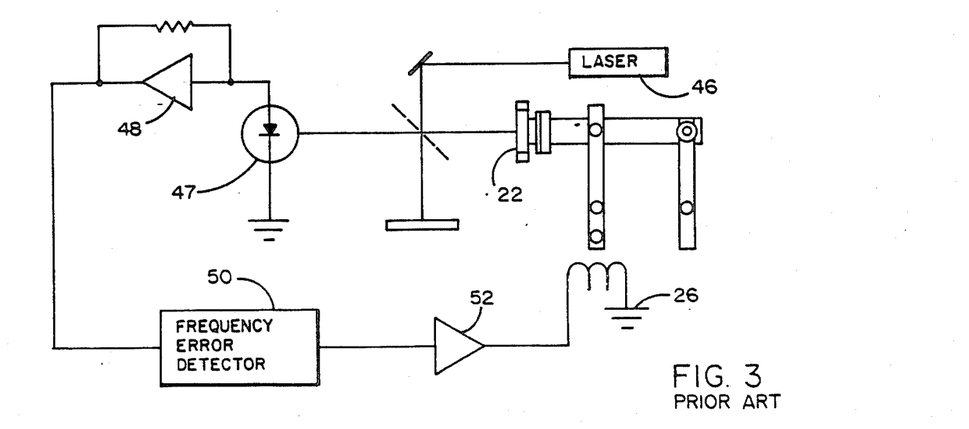
FIG. 3 is a diagrammatic showing of the closed loop mirror drive system of FIG. 1.

FIG. 3 shows the mirror drive control loop associated with the structure of FIG. 1. The control loop includes both electrical elements and mechanical elements. The electrical elements are a laser 46; a laser detector 47; a preamp 48; a frequency error detector 50; a power amplifier 52; and the D.C. torque motor 26. The mechanical elements of the mirror drive control loop are the movable mirror 22; the parallelogram structure which supports and moves it, including the flex pivots; and the mechanical portion of the motor.

As previously stated, the lowest resonant frequency in the mechanical elements of the mirror drive control loop is the upper limit for toleration of any ambient vibrations which are transmitted to the interferometer. In order to reduce, or eliminate, the essentially disabling effect of such ambient vibrations on the interferometer, it is necessary to increase as much as possible the lowest resonant frequency in the mirror drive control loop.

In view of this problem, it is logical to begin with the mechanical element in the loop which has the lowest resonant frequency, and reconstruct it in such a way as to get a maximum increase in that resonant frequency.

In the XM21 interferometer of FIGS. 1 and 2, experimental work has shown that the most serious initial resonance problem (because of its low frequency) was caused by the torque motor 26.

After development work succeeded in substantially solving that problem, the next resonance problem encountered proved to be caused by the mirror support at the front end of the movable mirror.

Subsequently, a third source of resonance problems proved to be the bearing structure, i.e., the flex pivots.

All of these problems need to be attacked at their source, which involves the vibration characteristics of the mechanical elements in the motor drive loop. In order to provide an interferometer which can tolerate most ambient vibrations, it is deemed important to eliminate from the interferometer, mechanical resonances below approximately 1,000 cycles per second (1 Ez).

In environments where higher frequency ambient vibrations are still encountered, some isolation of the interferometer may be required. But the extent of such isolation will be drastically reduced; and, therefore, the isolation-caused "noise" in the interferometer will be decreased radically.

Figure 6:
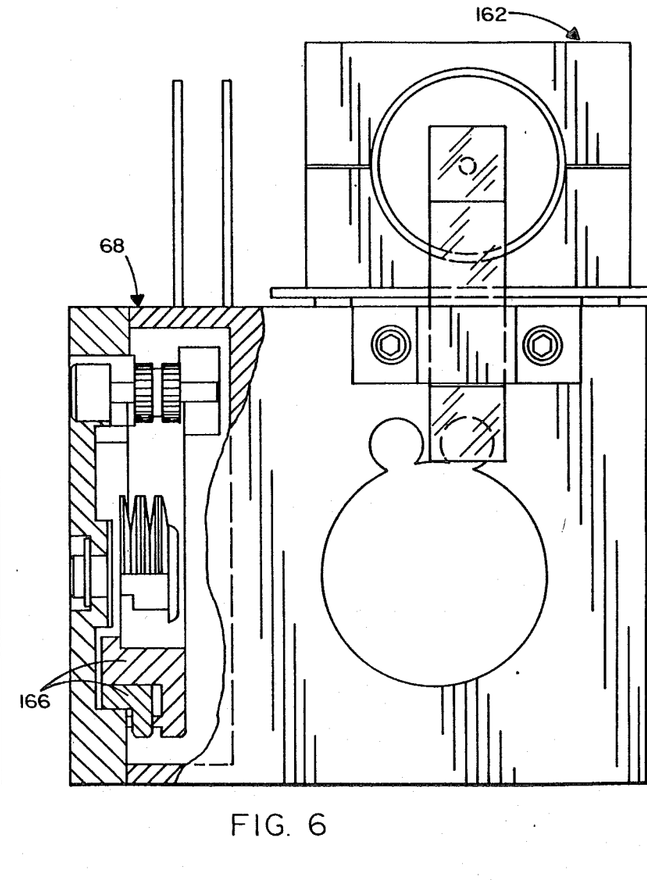
FIG. 6 is an elevation showing the left end (or front) of the interferometer of FIG. 4.
Figure 7:
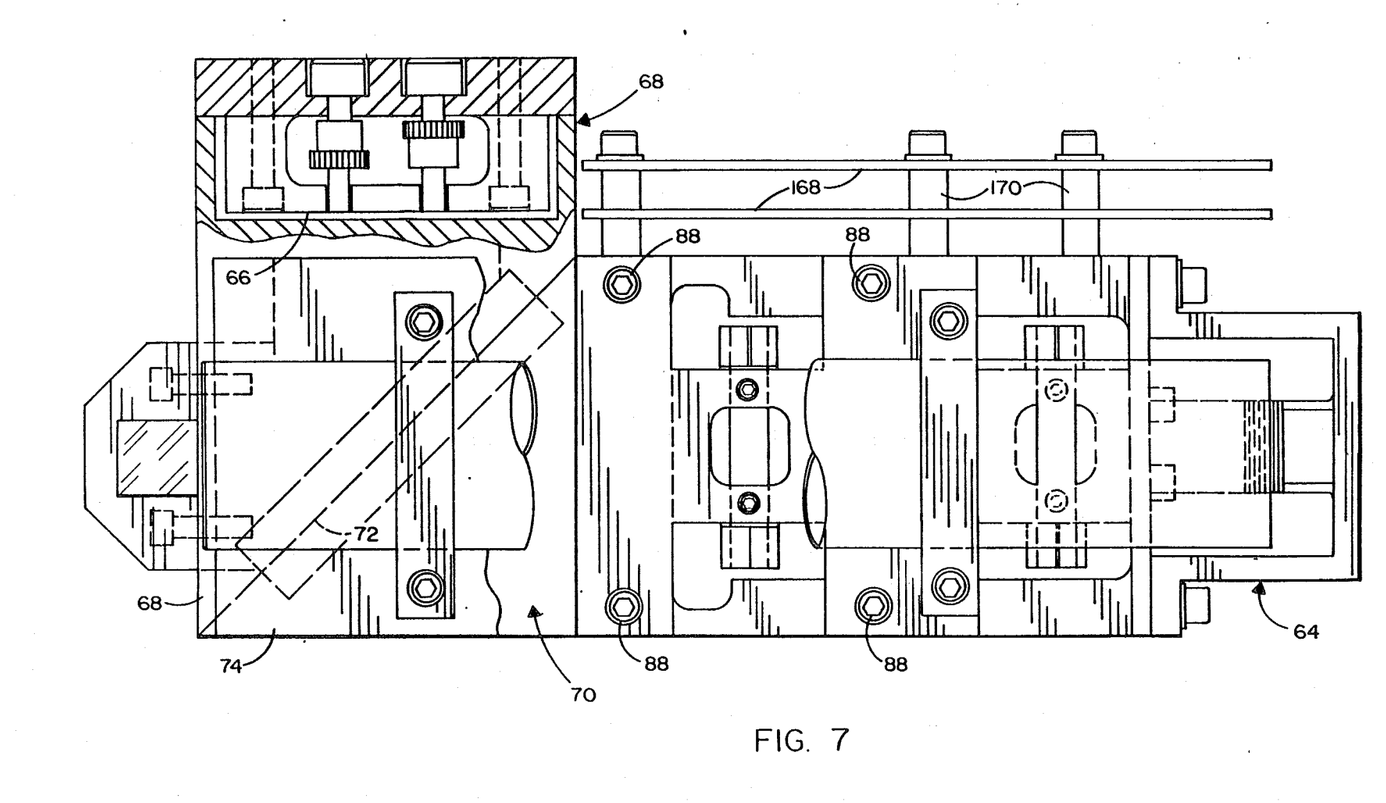
FIG. 7 is a plan, or top, view of the interferometer of FIG. 4.

FIGS. 4-7 are, respectively, side elevation, right end elevation, left end elevation and plan (top) views of an interferometer structure incorporating the present invention (FIGS. 6 and 7 are partly in cross-section). The interferometer is constructed as an essentially unitary structure, which will usually be mounted on a platform carrying other components.

A moving mirror surface 60 is provided as an integral part of a single movable element 62, which is driven from the rear (right in the figure) by a linear motor 64. A fixed mirror 66 (FIG. 7) is located in a side extension 68 of a housing 70 which supports and encloses the entire interferometer. A beamsplitter surface 72 is located between the main body portion 74 of the housing 70 and the side extension 68.

The analytical beam, which is infrared, is directed through the beamsplitter 72, which divides it into beams in the two "arms" of the interferometer. The beam in one arm is reflected by fixed mirror 66; and the beam in the other arm is reflected by moving mirror 60. The reflected beams are recombined at the beamsplitter, and then directed toward the sample and the detector. The radiation source, sample, and detector are not shown. A laser beam is sent through the interferometer for the purpose of establishing the sampling frequency; and a white light beam is sent through the interferometer for the purpose of synchronizing the starting points of successive scans by the analytical beam. The details of the optical structure are not shown, because they utilize customary elements, and because the emphasis herein is on the mechanical components of the interferometer.

Figure 4:
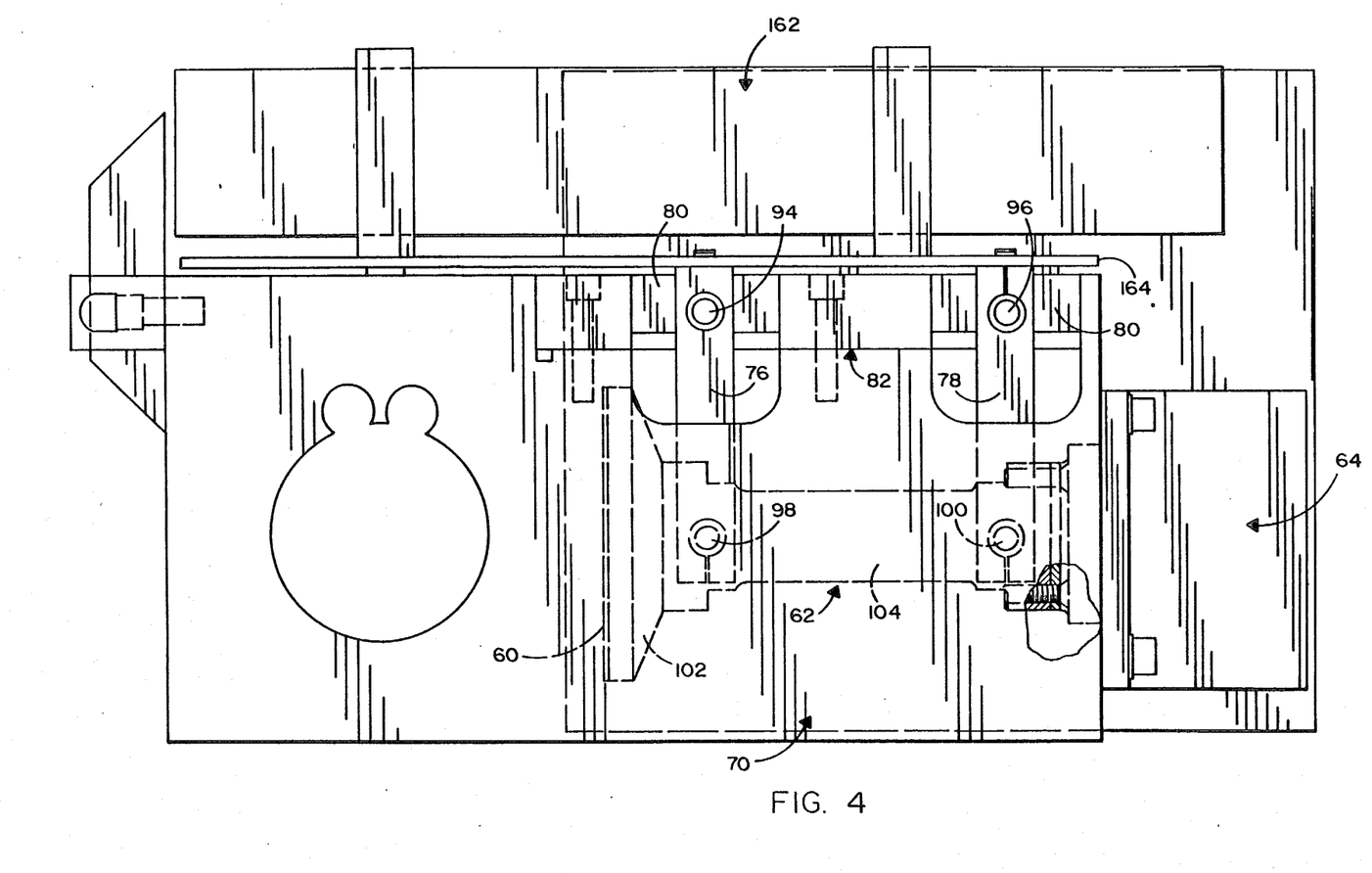
FIG. 4 is a side elevation of an interferometer structure incorporating the present invention.
Figure 5:
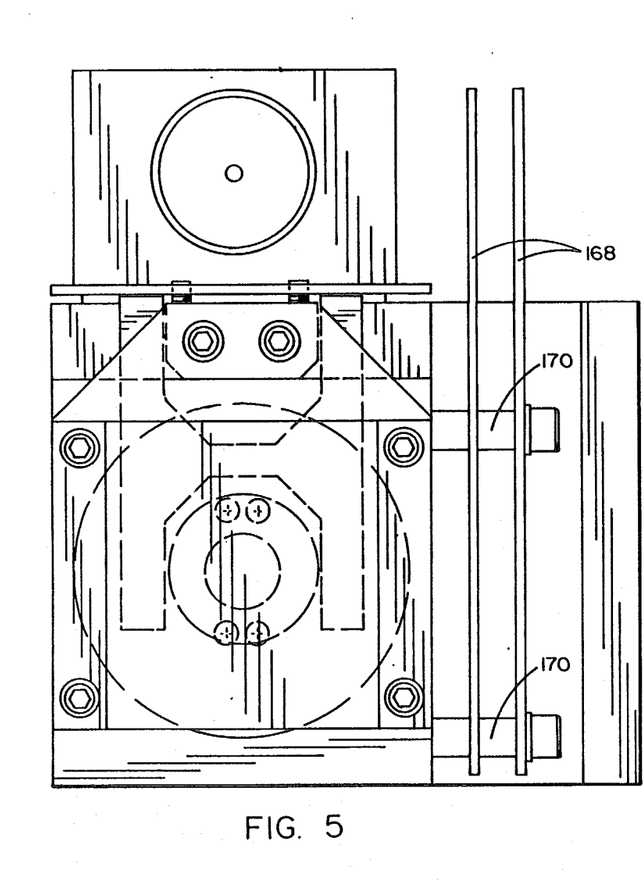
FIG. 5 is an elevation showing the right end (or rear) of the interferometer of FIG. 4.

As shown in FIG. 4, movable element 62 is supported by a parallelogram arrangement. This arrangement is shown more clearly in FIGS. 8-10, which are, respectively, side, top, and rear views of a sub-assembly which includes the moving mirror and its supporting structure.

Figure 9:
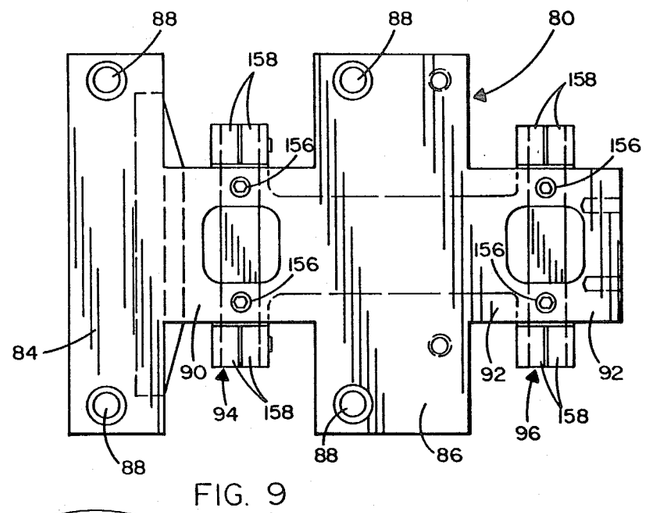
Figure 10:
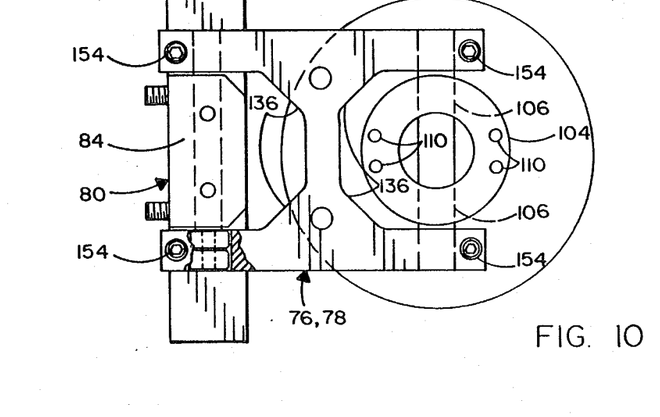

The parallelogram support includes a forward (near the mirror) vertical swing arm 76 and a rearward vertical swing arm 78. The upper ends of swing arms 76 and 78 are pivotally supported by a plate 80 which is adapted to be secured to the top surface 82 of the housing. As shown in FIG. 9, the supporting plate 80 has laterally widened portions 84 and 86, which are secured to the top of the interferometer housing by bolts 88. The narrower portions 90 and 92 of supporting plate 80 carry, respectively, laterally-extending axle assemblies 94 and 96, on which the upper ends of swing arms 76 and 78 are pivoted. The lower ends of swing arms 76 and 78 are pivotally connected to movable element 62 by means of laterally-extending axle assemblies 98 and 100. As seen in FIG. 10, each swing arm (76, 78) is H-shaped in cross-section, thus providing a laterally balanced supporting structure for movable element 62.

The movable mirror element 62 (FIGS. 4, 8 and 9) is preferably a single metallic piece, thereby reducing vulnerability to vibrations. Serious sources of low frequency resonance in prior art structures are the connection of the movable mirror to its support, and the flimsiness of the mirror-carrying surface.

The present invention, by using a single aluminum element having its surface 60 polished to constitute a mirror, eleminates the need for fastening the mirror to its supporting structure.

Of equal, or greater, importance is the fact that the use of a unitary movable mirror element allows the structure to be stiffened by a rotationally-symmetric flange, such as a frusto-conical portion 102, formed just behind the mirror surface 60. This conical stiffening portion permits the stiffness of the movable mirror to be increased enough to remove its low frequency resonance problems. This stiffened mirror-backing is not feasible when the mirror is fastened to its movable support by screws, as in the prior art construction.

The movable element 62 has a longitudinally-extending body portion 104 which may be hollow, as shown in FIG. 10, in order to reduce weight. The hollowing process may be accomplished by boring from the rear end. Laterlly-extending aligned holes 106 are formed in body portion 104 to receive the axle assemblies 98 and 100, which pivotally connect the movable element 62 to the swing arms 76 and 78.

As seen in FIG. 10, the rear annular surface of movable element 62 is provided with a plurality of threaded openings 110, which permit the moving portion of linear motor 64 to be secured directly to element 62.

Figure 8:
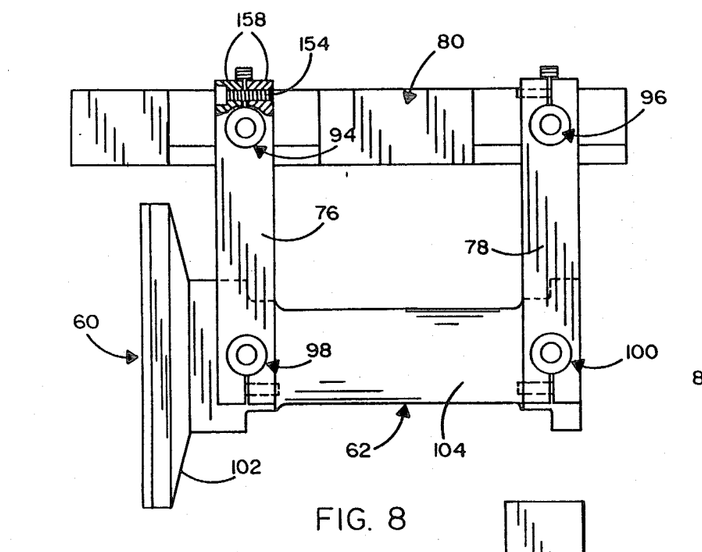
FIGS. 8, 9, and 10 are side, top, and rear views, respectively, of the subassembly of FIGS. 4-7 which includes the movable mirror element and its supporting structure.

The complete structure shown in FIGS. 8–10, including the supporting plate 80, parallelogram linkage 76–78, and the movable mirror member 62, is formed as a separate sub-assembly. Then the supporting plate 80 is secured to the interferometer housing. This method of building the interferometer is highly desirable, if not mandatory.

FIGS. 11–14 are views of the movable mirror member 62 before it is incorporated into the sub-assembly of FIGS. 8–10. As previously stated, it is advantageous to use a single metal (preferably aluminum) piece to form member 62. It is preferably shaped by a lathe. The front end is polished to provide the mirror surface.

Figure 11:
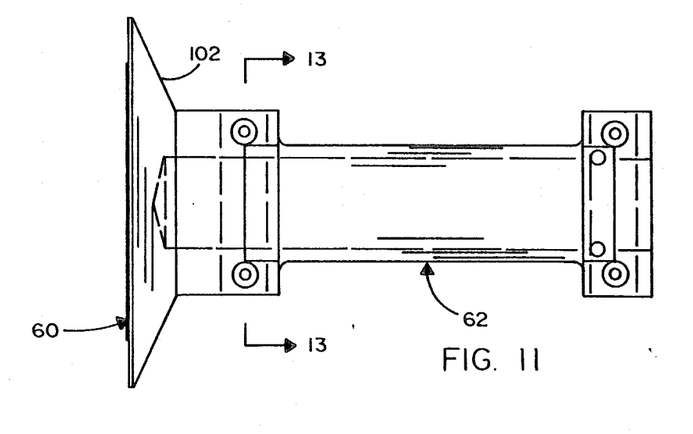
FIGS. 11 and 12 are top and front views, respectively, of the moveable mirror element.
Figure 12:
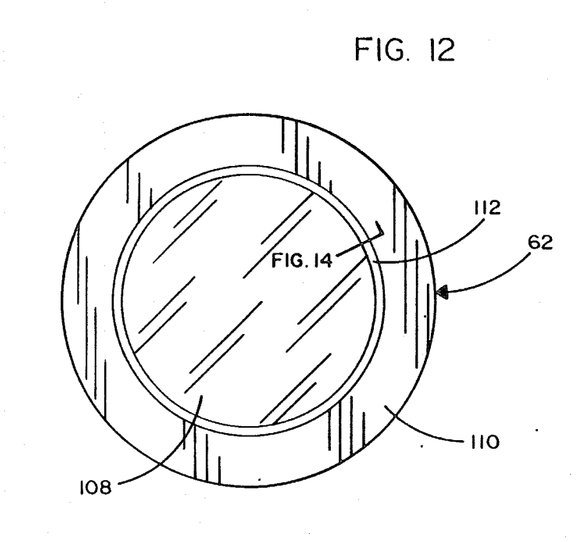

As seen in FIGS. 11 and 12, which are top and front views, respectively, the mirror end 60 of member 62 has a relatively large central portion 108 which reflects the infrared analytical beam. A relatively narrow annular portion 110 is used to reflect both the laser beam, which determines the sampling frequency of the interferometer, and the white light beam, which serves to synchronize successive scans of the infrared beam. An annular groove, or relief channel, 112 between the mirror surfaces 108 and 110 is provided to permit those surfaces to be individually polished. This is necessary because the annular surface 110 is slightly set back from the central surface 108, in order to offset the peak of the white light interferogram from the peak of the infrared interferogram.

Figure 14:
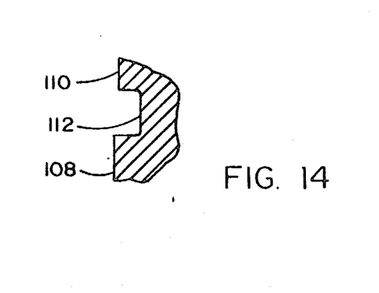
FIG. 14 is an enlarged cross-section taken through the outer edge of the front, or mirror, end of the moveable mirror element.

FIG. 14 is a greatly enlarged partial cross-section showing the axial spacing between mirror surfaces 108 and 110, which are separated by groove 112. The setback distance in the preferred construction is 0.003 inch. The diameter of the central disc shaped mirror surface 108 is 1.4 inch; the width of the groove 112 is 0.1 inch; and the diameter of the combined mirror surfaces 108 and 110 is 2.0 inches.

Figure 13:
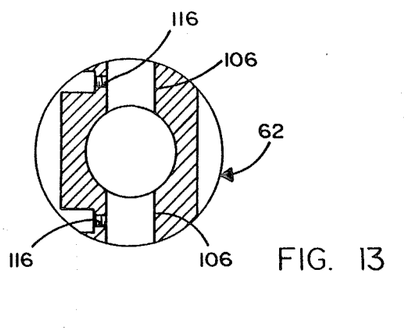
FIG. 13 is a cross-section taken on the line 13—13 of FIG. 11.

FIG. 13, which is a cross-section taken along the line 13—13 of FIG. 11, shows a laterally-extending bore provided by aligned holes 106 and adapted to receive an axle assembly 98. Threaded openings 116 are provided to receive set screws which engage the shaft of the axle assembly to prevent relative rotation between the shaft and the member 62.

Figure 15:
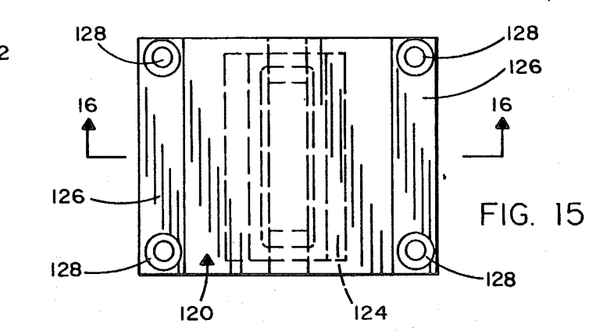
FIG. 15 is a partial rear elevation of the interferometer showing the linear motor which is secured thereto.
Figure 16:
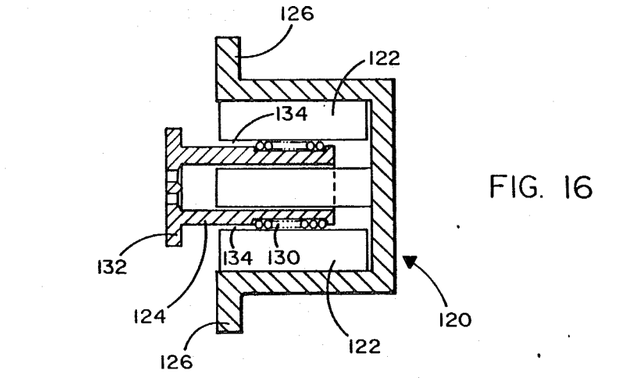
FIG. 16 is a section taken on the line 16—16 of FIG. 15.

FIGS. 15 and 16 show details of the linear motor 64. FIG. 15 is an elevation view of the motor unit as seen from the rear of the interferometer, i.e., as seen from the right end of the structure in FIGS. 4 and 7. The linear motor has essentially three components: a housing 120, magnets 122 (FIG. 16) secured inside the housing, and an internal coil-carrying portion 124 secured to the movable element 62. As seen in FIG. 15, the housing has two vertically-extending lateral flanges 126 which are secured to the interferometer housing by suitable fastening means 128.

FIG. 16 a section along a horizontal plane showing the interior of motor 64. The moving portion 124 of the motor carries a coil 130, and has a flange 132, adapted to be secured to the rear of movable element 62. Two vertically-extending magnets 122 are located at opposite sides of coil 130.

The motor 64 preferably has a rectangular, rather than a circular, shape, in order to minimize potential problems of binding and air gap change, as the movable element 62 and coil member 124 are caused to move slightly up and down by the parallelogram linkage 76–78. Furthermore, the motor coil member 124 of motor 64 preferably has a vertical dimension substantially greater than its horizontal dimension. The air gaps 134 between the moving and fixed elements of the motor extend vertically. Thus, there is no change in the size of either air gap as the moving members incur their slight vertical displacement. This displacement is accommodated by allowing sufficient space between the upper and lower edges of coil member 124 and the adjacent inner surfaces of housing 120.

The direct linear force exerted by motor 64 in the plane of the axis of movable element 62 avoids one of the most serious vibration resonance problems of the prior art structure. Essentially, the linear motor arrangement of this application eliminates the motor as a source of vibration resonance problems.

The arrangement of the parallelogram supporting structure in the present invention is significantly different from the prior art structure shown in FIGS. 1–3. The two swing arms 76 and 78 (see FIGS. 5 and 6) are preferably identical to one another, each having the H-shaped cross-section shown in FIG. 10. Four strengthening webs 136 provide stiffening of the H structure.

The use of two H-shaped arms is made possible by elimination of the adjustment eccentric 39 (FIG. 1). Instead of using that adjustment mechanism, fore-to-aft dimensional accuracy is assured during machining by carefully locating (using jig grinding): (a) the holes 106 in the movable mirror element 62, and (b) the holes in the supporting plate 80 which carries the axle assemblies 94 and 96. Another reason for dispensing with the adjustment eccentric is the need to eliminate the flex pivots. Experimental evidence showed that the structure using flex pivots had resonant frequencies at approximately 600 Hertz and 950 Hertz. This became apparent after the original 200 Hertz resonance had been eliminated. The 600 Hertz resonance associated with the flex pivots is a particularly disabling "pitching" vibration mode having an axis of rotation between the two supports.

It was determined that ball bearings should be used instead of flex pivots, because they would be easier to align and require no tilt/sway adjustment. However, the substitution of ball bearings initially led to a new problem. The upwardly and downwardly extending sides of the H-shaped swing arms 76 and 78 had a tendency to vibrate like the tines of a tuning fork. In other words, their movement was not restrained by the axle assemblies 94, 96, 98 and 100.

Figure 17:
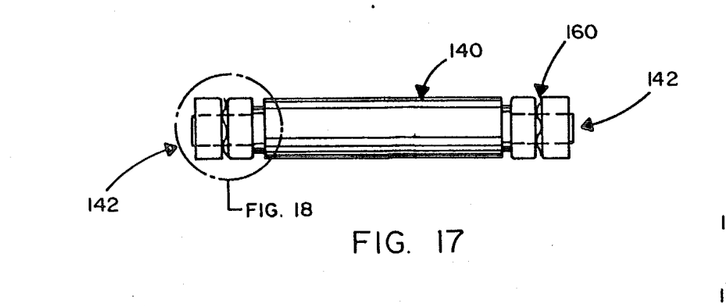
FIG. 17 shows one of the axle assemblies used in pivotally supporting the movable mirror element.
Figure 18:
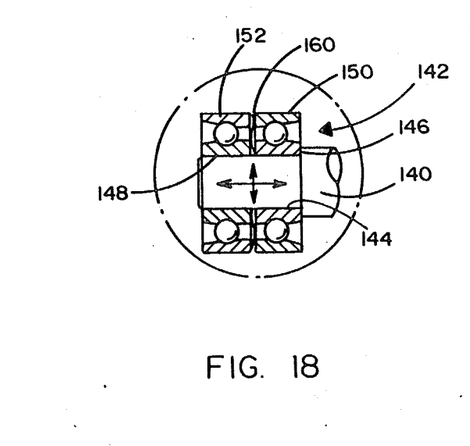
FIG. 18 is an enlarged cross-section taken through the bearing structure at one end of the axle assembly of FIG. 17.

It was determined that the solution to this problem was to use pre-loaded duplex ball bearings at each of the eight pivotal connections. The preferred structure is shown in FIGS. 17 and 18. FIG. 17 shows a separate axle assembly carrying its rolling bearings, which are preferably ball bearings (for reasons of economy). FIG. 18 is a cross-section taken through one of the pre-loaded duplex ball bearing structures. Eight of these rolling bearing structures are needed for the four axle assemblies 94, 96, 98 and 100.

As shown in FIG. 17, each axle assembly comprises a central shaft 140 and two bearing assemblies 142. FIG. 18 shows the details of a single bearing assembly 142. The inner race 144 of the inner roller bearing engages a flange 146 near the outer end of shaft 140. The inner race 148 of the outer roller bearing is secured to the reduced diameter end of shaft 140 by suitable adhesive material, such as Loctite No. 290. The outer races 150 and 152 of the inner and outer bearings are held in position by threaded clamping members 154 (see FIGS. 8 and 10).

The shaft 140 of each lower axle assembly 98 and 100 is secured to the movable mirror member 62; and its bearing assemblies are mounted inside openings in the downwardly-extending sides of the respective H-shaped swing arm. The shaft 140 of each upper axle assembly 94 and 96 is secured to the fixed support plate 80 by threaded members 156 (see FIG. 9); and its bearing assemblies are mounted inside openings in the upwardly-extending sides of the respective H-shaped swing arm.

Each of the four sides of each H-shaped swing arm 76 and 78 has its end bifurcated to provide slightly spaced portions 158 (FIGS. 8 and 9), which are drawn together by the threaded clamping members 154, thereby providing a load on the outer races 150 of the respective duplex bearing assembly. As shown in FIGS. 17 and 18, a spring element 160, such as a wave shaped resilient washer, is located between the inner and outer bearings to exert a force tending to push them apart. The combination of this resilient load with the load between the axle assemblies and the sides of the H-shaped swing arms eliminates the "tuning fork" vibration problem, without creating a binding effect in the ball bearings.

Other structural elements shown in the complete interferometer of FIGS. 4-7 include a laser generator 162 mounted on top of the interferometer, a heat shield 164 between the laser generator and the body of the interferometer, a pair of annular wedge-shaped members 166 used to initially adjust the position of non-moving mirror 66, and printed circuit boards 168 which may be conveniently supported on rods 170 extending from one side of the interferometer body.

Figure 19:
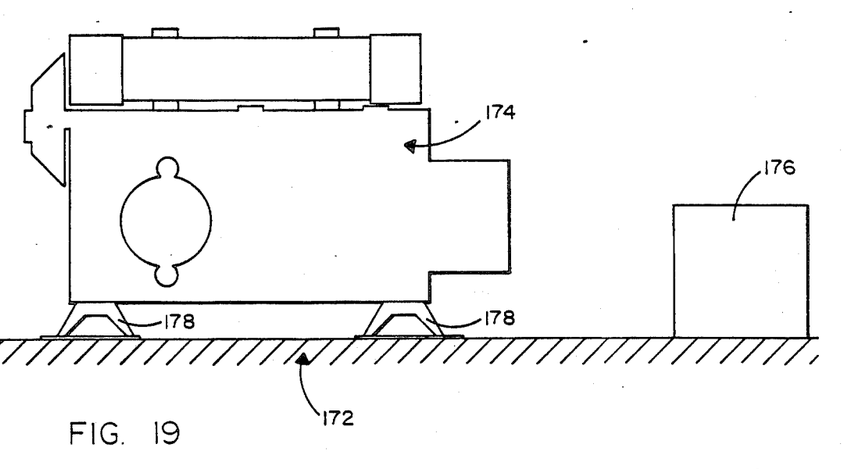
FIG. 19 is an illustration of a possible unitary structure including both an external vibration source, and vibration-isolating mounting for the interferometer.

FIG. 19 is used both to illustrate an integrated system in which a vibration source is mounted on the same platform as the interferometer, and also to illustrate the possible use of vibration isolators, if the interferometer performance is still affected by ambiant vibrations, in spite of the elimination of low frequency resonance in the interferometer.

A platform 172 carries both an interferometer 174 and a vibration source 176, such as a cooler compressor. If some vibration isolation is still required, the interferometer may be mounted on several standard vibration isolators 178.

Even though vibration isolators may be required in extreme situations, the interferometer of the present invention has decided advantages over the prior art interferometers. This is true because of the greatly reduced isolation which it requires.

As indicated above, it is extremely important to eliminate, or minimize deflection of the movable mirror element due to vibration. The amount of deflection of a vibration isolated structure is a function of the stiffness of its isolation mounting. A relatively stiff isolation mounting permits much less deflection than a relatively flexible isolation mounting.

Each vibration-isolated structure, such as the interferometer and vibration isolators 178 of FIG. 19, has as a unit its own natural frequency of vibration. A high natural frequency is very desirable because that is accompanied by a low amount of deflection. In other words, the natural frequency and deflection distance are inversely related.

The natural frequency of the isolation mounted interferometer is the point of peak vibration amplitude, or resonance. Above this frequency, the amplitude falls off rapidly and drops into a region of isolation. It is in this region of isolation in which the internal resonances of the interferometer are protected from ambient influences.

Therefore, the natural frequency of the isolation-mounted interferometer must be below, and substantially below any internal resonance frequency of the interferometer. For example, it would be prudent to have the lowest internal resonance frequency at least four times as high as the natural frequency of the isolation mounted interferometer.

Translated into relevant values, the interferometer of the present invention, having its lowest internal resonance at approximately 1000 Hertz, could use an isolation mounting having a natural frequency of 250 Herta. A prior art interferometer, having its lowest internal resonance at 200 Hertz, would be limited to a mounting having a natural frequency of 50 Hertz. An isolation-mounted interferometer having a natural frequency of 50 Hertz would have a deflection motion approximately twenty-five times as large as the deflection motion of an isolation-mounted interferometer having a natural frequency of 250 Hertz.

Figure 20:
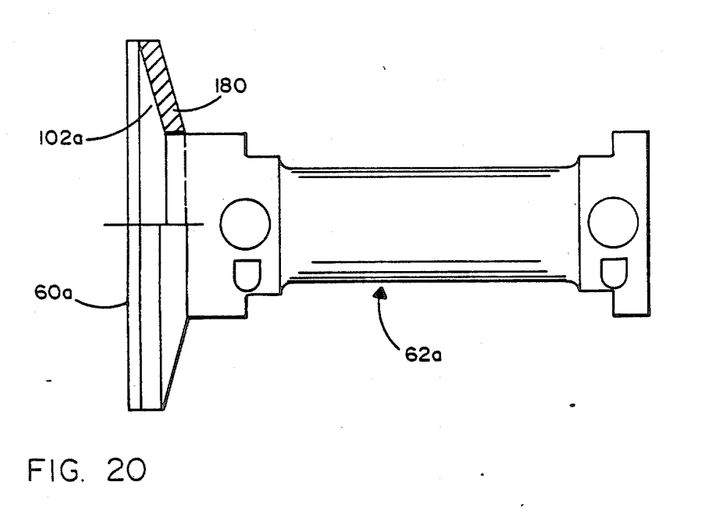
FIG. 20 is a side elevation, partly in cross-section of a moveable mirror element modified to provide increased stiffening.

FIG. 20 illustrates a modification of the backup stiffening structure for the movable mirror. It shows a movable mirror element 62a having a mirror surface 60a and similar in construction to element 62 in the prior embodiments, with one additional feature. A separately-formed conical, concave disc 180 is glued to the back of the cone-shaped stiffening portion 102a.

This construction resulted from resonance problems at the mirror, encountered in experimental work with certain ambient vibration sources. It has resulted in a surprising improvement in vibration resistance of the mirror, which may result partially from the additional structural thickness of the mirror backing, and partially from the damping effect of the adhesive used to secure disc 180 to the cone-shaped portion 102a.

From the foregoing description, it will be apparent that the apparatus and method disclosed in the application will provide the significant functional benefits summarized in the introductory portion of the specification.

The following claims are intended not only to cover the specific embodiments disclosed, but also to cover the inventive concepts explained herein with the maximum breadth and comprehensiveness permitted by the prior art.

What is claimed:

1. An interferometer structure, for use in an environment in which it is subjected to ambient vibration comprising:
   a movable member which provides a mirror at one end thereof, and which is so constructed as to have the highest practicable minimum mechanical resonant vibration frequency;
   driving means which causes back and forth movement of the movable member, and which includes an operative interconnection with the movable member so constructed as to have the highest practicable minimum mechanical resonant vibration frequency;
   supporting means for the movable member which constrains it to move along a predetermined path, and which includes an operative interconnection with the movable member so constructed as to have the highest practicable minimum mechanical resonant vibration frequency; and
   a mirror drive loop, for controlling the velocity of the movable member, which includes the above-recited mechanical elements, and also includes electronic components comprising sensing, feedback and control circuitry, whose maximum performance is limited by the minimum mechanical resonant vibration frequency in the mechanical elements of the mirror drive loop.

2. The interferometer structure of claim 1 wherein:
   the driving means exerts a linear force acting on the end of the movable member remote from the mirror, such force acting in a vertical plane aligned with the central axis of motion of the movable member.

3. The interferometer structure of claim 1 wherein:
   the movable member has a conical strengthening flange immediately behind the mirror.

4. The interferometer structure of claim 3 wherein:
   the movable member, including the mirror, is a one-piece metal structure.

5. The interferometer structure of claim 1 wherein the supporting means comprises:
   a fixed member secured to the interferometer housing;
   a parallelogram linkage having substantially vertical forward and rearward swing arms; and
   axle assemblies which pivotally connect the upper ends of the swing arms to the fixed member, and the lower ends of the swing arms to the movable member.

6. The interferometer structure of claim 5 wherein:
   each swing arm is a substantially H-shaped element having two upwardly-extending spaced sides pivotally connected to the fixed member, and two downwardly-extending spaced sides pivotally connected to the movable member at laterally opposite sides thereof.

7. The interferometer structure of claim 6 wherein each side of each H-shaped swing arm is rotationally associated with the respective axle assembly by two pre-loaded rolling bearings which prevent low frequency mechanical vibration resonance in the respective sides of the H-shaped swing arms.

8. An interferometer structure, for use in a high ambient vibration environment, comprising:
   a movable member having a mirror at one end thereof and an essentially conical flange immediately behind the mirror, thereby preventing low frequency mechanical vibration resonance of the mirror;
   a linear-force motor arranged to cause back and forth movement of the movable member, the motor acting on the end of the movable member remote from the mirror, exerting a force thereon acting in a vertical plane aligned with the central axis of motion of the movable member, thereby preventing low frequency mechanical vibration resonance of the interface of the motor and the movable member;
   a parallelogram linkage for supporting the movable member, the linkage extending substantially vertically and being pivotally connected at its upper end to the interferometer housing and at its lower end to the movable member; and
   axle assemblies providing the pivotal connections of the linkage to the housing and to the movable member, the axle assemblies including at each pivotal connection a pair of pre-loaded rolling bearings which prevent low frequency mechanical vibration resonance in the parallelogram linkage.

9. The interferometer structure of claim 8 wherein the movable member is a single-piece aluminum element, and the pivoted surface is formed by polishing the end of the aluminum element.

10. The interferometer structure of claim 8 wherein the motor is rectangular in cross-section and includes vertically-extending magnets secured to its housing, and a coil carried by a rectangular element secured to the rear of the movable member.

11. The method of providing an improvement in the performance of interferometers subjected to ambient vibrations, such as interferometers which include a servo control loop having both electronic and mechanical elements, which method comprises the following steps:
   first determining which mechanical element has the lowest vibration frequency resonance;
   making structural changes in that element which substantially increase its lowest vibration frequency resonance;
   next determining which mechanical element currently has the lowest vibration frequency resonance;

making structural changes in that element which substantially increase its lowest vibration frequency resonance; and continuing the process of determining the current lowest mechanical vibration frequency resonance, and making structural charges to increase such vibration frequency resonance, until the lowest such resonance in the interferometer is above a predetermined resonant frequency goal.

12. A structure comprising the interferometer structure of claim 8 and also comprising:
an operating apparatus which creates substantial vibrations;
a supporting structure which carries both the interferometer structure and the operating apparatus; and
vibration-isolation means between the supporting structure and the interferometer structure for isolating the latter from the external vibrations;
said vibration-isolating means and the interferometer structure, as a combination, having a high natural frequency, which nevertheless is substantially below the lowest mechanical vibration resonance frequency within the interferometer structure.

13. The interferometer structure of claim 8 which also comprises:
a stiffening disk glued to the conical flange which is immediately behind the movable mirror.

14. The interferometer structure of claim 1 in which the minimum mechanical resonant vibration frequency is not substantially lower than 1,000 Hertz.

15. An interferometer, which provides a spectral signal, and which is subject to structure-borne vibration capable of creating noise interference with the signal, comprising:
a movable member having a mirror thereon;
means for driving the movable member, including a motor and means operatively associating the motor with the movable member;
means for supporting the movable member, including a supporting structure and means operatively associating the supporting structure with the movable member;
a mirror drive loop, for controlling the velocity of the movable member, combining electronic components and mechanical components;
the electronic components of the mirror drive loop including sensing, feedback, and control circuitry;
the mechanical components of the mirror drive loop including the movable member, the means operatively associating the motor with the movable member, and the means operatively associating the supporting structure with the movable member;
each of the mechanical components of the mirror drive loop having its lowest mechanical resonant vibration frequency high enough to allow the mirror drive loop to attenuate the effects of structure-borne vibration, in order to avoid degradation of the spectral signal-to-noise ratio.

16. The interferometer of claim 15 in which the lowest resonant vibration frequency of any of the mechanical components of the mirror drive loop is at least approximately 1,000 Hertz.

17. The interferometer of claim 15 in which the maximum frequency of the mirror drive loop is substantially greater than the maximum vibration frequency of the structure-borne vibration, and substantially less than the minimum resonant vibration frequency of any of the mechanical components of the mirror drive loop.

18. The interferometer structure of claim 17 wherein:
the motor exerts a linear force acting on the end of the movable member remote from the mirror, such force acting in a vertical plane aligned with the central axis of motion of the movable member.

19. The interferometer structure of claim 17 wherein:
the movable member has a conical strengthening flange immediately behind the mirror.

20. The interferometer structure of claim 19 wherein:
the movable member, including the mirror, is a one-piece metal structure.

21. The interferometer structure of claim 17 wherein the supporting means comprises:
a fixed member secured to the interferometer housing:
a parallelogram linkage having substantially vertical forward and rearward swing arm; and
axle assemblies which pivotally connect the upper ends of the swing arms to the fixed member, and the lower ends of the swing arms to the movable member.

22. The interferometer structure of claim 21 wherein:
each swing arm is a substantially H-shaped element having two upwardly-extending spaced sides pivotally connected to the fixed member, and two downwardly-extending spaced sides pivotally connected to the movable member at laterally opposite sides thereof.

23. The interferometer structure of claim 22 wherein:
each side of each H-shaped swing arm is rotationally associated with the respective axle assembly by two preloaded ball bearings which prevent low frequency mechanical vibration resonance in the respective sides of the H-shaped swing arms.

* * * * *